United States Patent

Cox

[15] 3,698,437
[45] Oct. 17, 1972

[54] CONTROL VALVE ASSEMBLY WITH MECHANICAL FEEDBACK

[72] Inventor: Robert M. Cox, Northridge, Calif.
[73] Assignee: SLI Industries
[22] Filed: July 15, 1971
[21] Appl. No.: 162,831

[52] U.S. Cl. .............................................137/625.62
[51] Int. Cl. .....................F16k 11/07, F16k 31/04
[58] Field of Search........137/625.62, 625.63, 625.64, 137/83, 85

[56] References Cited

UNITED STATES PATENTS

| | | |
|---|---|---|
| 3,029,830 | 4/1962 | Klouer et al. ......137/625.62 X |
| 3,401,711 | 9/1968 | Kubilos........................137/83 |
| 3,486,801 | 12/1969 | Frayer ..............137/625.63 X |
| 3,489,179 | 1/1970 | McNeil et al. ........137/625.62 |
| 3,537,467 | 11/1970 | Marshall...........137/625.64 X |

Primary Examiner—Henry T. Klinksiek
Attorney—Fulwider, Patton, Rieber, Lee & Utecht and Thomas M. Small

[57] ABSTRACT

A valve assembly comprising a spool valve for controlling flows of actuating fluid to and from a hydraulic cylinder by movement of the spool in opposite directions from a neutral position in response to unbalanced pressures in chambers at the ends of the spool, and a pilot valve assembly mounted on the end of the spool valve housing and including an electromagnetically actuated flapper for variably restricting flows from the end chambers. Two balanced springs engage opposite sides of the flapper to urge it toward a centered position, and a longitudinally slidable feedback pin between one spring and the end of the spool adjusts the force of the spring in accordance with changes in the position of the spool.

17 Claims, 4 Drawing Figures

INVENTOR.
ROBERT M. COX
BY Fulwider, Patton, Rieber
Lee, and Utecht
ATTORNEYS 3,698,437

CONTROL VALVE ASSEMBLY WITH MECHANICAL FEEDBACK

BACKGROUND OF THE INVENTION

This invention relates to the control of the flow of actuating fluid to a controlled device such as a fluid motor, either rotary or reciprocating, and relates more particularly to control assemblies of the type having piston means or a valve member, usually a spool, which is moved back and forth along a predetermined path and varies the flow of actuating fluid to the controlled device in accordance with the position of the valve member along its path.

Typical applications for such a controlled device include the actuation of backhoes, cranes, hydraulic hoists and the like with reciprocating motors, and also the controlled operation of rotary motors. For these purposes, an operator at a control station may use a manual selector to produce signals for effecting the desired movements of the controlled device, such signals typically being either hydraulic or electrical signals that are transmitted to the control valve assembly to produce movements of the valve member that accomplish the desired movement of the controlled device, including controlled acceleration, deceleration, and positioning of the controlled device.

The general operating characteristics of such control valve assemblies are known in the art, example of prior approaches being shown in U.S. Pat. Nos. 3,233,623 and 3,339,572, both of which discloses spool-type control valves actuated by pilot valve assemblies for varying the pressures in chambers of the control valve that are arranged to exert opposed forces on the valve spool. When these forces are balanced, the spool is held stationary, while unbalanced forces move the spool in one direction or the other in its bore to vary the flow of fluid to the controlled device in accordance with the displacement of the spool from a selected position.

To control such displacement, the prior pilot valve assemblies include a pair of opposed orifices receiving fluid flows from the pressure chambers, a flapper movably mounted between the orifices for variably restricting these flows and thus varying the pressures therein, and an actuator for urging the flapper toward a selected orifice with a selected force which determines the pressure rise in the associated orifice. A mechanical feedback linkage connects the valve spool to the flapper and applies a force thereto in opposition to the actuating force, thereby balancing the force on the flapper when the spool arrives at a new position providing the desired new flow rate to the controlled device. In conventional practice, the feedback linkage comprises a lever or leaf spring that is connected to the spool and projects radially therefrom toward the flapper, an arrangement which works satisfactorily but is relatively complex in construction and difficult to assemble, adjust and service. Such prior devices also are difficult to stack in groups to multiply the capacity of a system.

SUMMARY OF THE INVENTION

The present invention resides in an improved control assembly of the foregoing general character with a feedback linkage of simpler, and relatively inexpensive, construction which facilitates adjustment, disassembly and reassembly during servicing, replacement of parts and the like, while providing highly effective and fine control of the output of the assembly. An important objective of the invention is to provide such a control assembly with a pilot valve subassembly, including the feedback linkage, which is quickly and easily removable as a unit, and may be reassembled with equal ease and with little or no adjustment required to place the assembly in condition for operation, so that such operations are capable of being performed in the field without need for highly skilled personnel or special equipment. The improved control assembly also is conveniently stackable for increased capacity.

More specifically, in the preferred embodiment of the invention shown herein for purposes of illustration, a valve spool is mounted in a bore having one end adjacent one side of the valve housing, and the pilot valve subassembly is mounted adjacent the end of the spool bore with a feedback element in the form of a pin slidably mounted in the pilot valve subassembly and projecting into the spool bore into engagement with the adjacent end of the spool. A spring is compressed between this pin and one side of the flapper, and a second adjustable spring acts against the opposite side of the flapper to counterbalance the force of the first spring when the spool is in its initial, neutral position, thus yieldably holding the flapper centered between the two orifices when the spool is in the selected starting position.

With this arrangement, movement of the spool out of its starting position in response to an unbalanced pressure condition created by movement of the flapper by the actuator, is accompanied by parallel movement of the feedback pin, which changes the force exerted by the first spring on the flapper to move the latter in response to the motion of the spool, until a new force balance is obtained with the spool in a new selected position. The feedback pin is mounted on the pilot valve assembly for removal therewith, so that access to the valve spool is permitted simply by removing the pilot valve subassembly, the end of the spool bore preferably being closed only by the pilot valve subassembly. The springs acting on the flapper are easily balanced in a simple manual operation to adjust the starting positions of the flapper and the spool, both initially and after disassembly and reassembly of the unit.

Other objects and advantages of the invention will become apparent from the following detailed description, taken in conjunction with the accompanying drawings.

DETAILED DESCRIPTION

Figure 1:
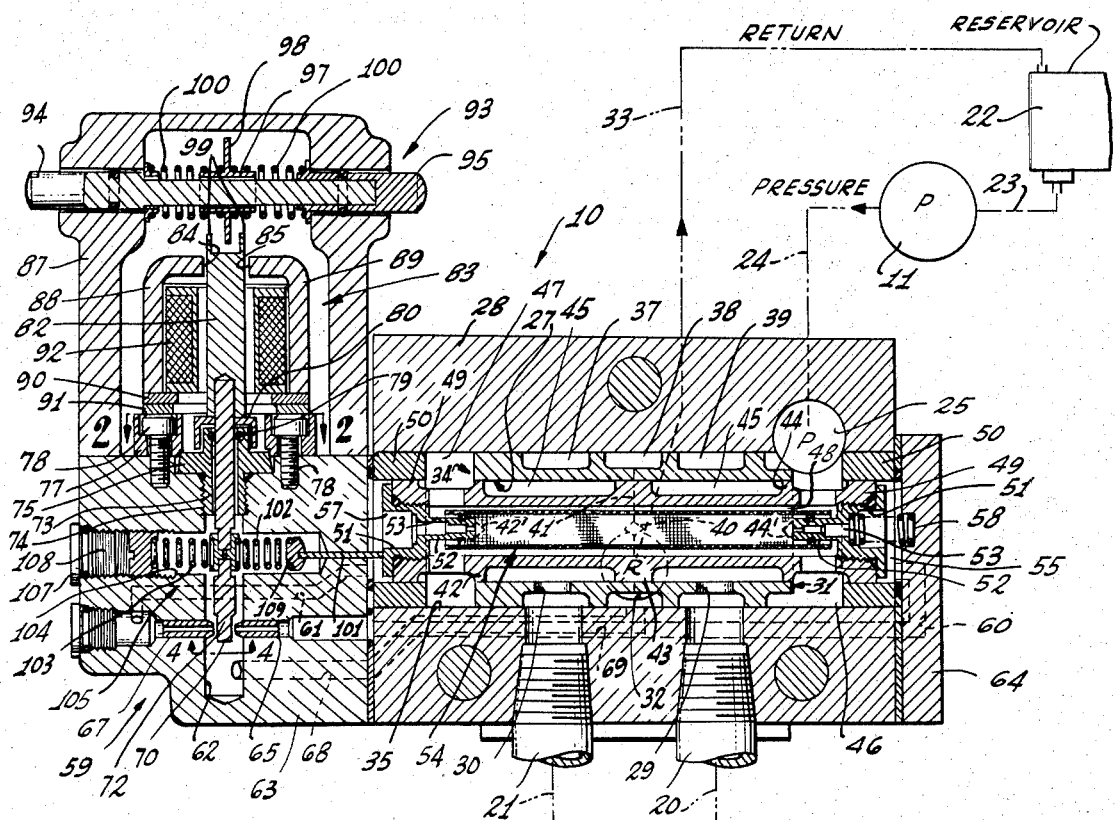
FIG. 1 is a fragmentary cross-sectional view taken in a vertical, longitudinal plane through a control valve assembly embodying the novel features of the present invention, with a schematic illustration of the flow circuitry controlled by the valve assembly.

As shown in the drawings for purposes of illustration, the invention is embodied in a valve assembly, indicated generally by the reference number 10 in FIG. 1, for controlling a flow of actuating fluid under pressure from a source such as a pump 11 to and from the opposite end portions 12 and 13 of a hydraulic cylinder 14 to move a piston 15 therein to different selected positions and at different selected rates of movement. The piston is connected to a piston rod 17 projecting through sealed openings 18 and 19 in the opposite end walls of the cylinder for attachment to a driven device (not shown) so that back-and-forth motion of the piston correspondingly moves the driven device.

For example, the cylinder 14 might be used to raise and lower a crane or the like, and to hold the crane in different selected positions. The control valve assembly 10 is responsive to input signals, or commands, originated by the operator of the crane, and is operable to deliver fluid under pressure to either end of the cylinder through one of two fluid lines 20 and 21 at variable flow rates which determine the rate of movement of the piston 15, and thus of the driven device. The valve assembly also is operable to produce and maintain a selected rate of motion until a desired position is achieved, and to hold the driven device in any such position after it has been reached.

As shown schematically in FIG. 1, the pump 11 draws fluid from a reservoir 22 through an intake line 23 and forces the fluid under pressure through a supply line 24 to the control valve assembly 10 and a pressure port 25 therein. This port delivers the fluid into an elongated bore 27 in a tubular valve housing 28, from which the fluid can flow to one of two outlet ports 29 and 30 communicating respectively with the two fluid lines 20 and 21 leading to the opposite end portions of the cylinder 14.

A valve spool 31 is slidable back and forth in the bore 27 to control the communication between the pressure port 25 and the two outlet ports 29 and 30, blocking all such flow when the spool is in a preselected, neutral position shown in FIG. 1. As the spool is moved in either direction out of this neutral position, it opens a connecting passage to one of the outlet ports and then progressively increases the effective flow area of the passage, thus admitting actuating fluid through the passage to the associated end 12, 13 of the cylinder 14 at a rate determined by the amount of displacement of the spool from its neutral position.

At the same time, such movement of the spool 31 connects the other outlet port 29, 30 to a return port 32 in the housing 28 and thus to a return line 33 leading back to the reservoir 22. This permits fluid that is exhausted from the end of the cylinder 14 toward which the piston 15 is moving, to be returned through the control valve assembly 10 to the reservoir.

In the illustrative valve, the spool 31 slides in a linear sleeve 34 which is fitted tightly in a bore 35 in the valve housing 28, the spool bore 27 being defined by the inside wall of the linear sleeve, which has three axially spaced peripheral grooves in its outer surface forming flow chambers 37, 38 and 39 for fluid. The two outlet ports 29 and 30 are formed in the liner sleeve to open into the left and right chambers 37 and 39, which communicate with the lines 21 and 20, respectively, and the return port 32 is formed in the valve housing to open into the central chamber 38.

A diamond-shaped slot 40, shown in broken lines in FIG. 1, is formed in the sleeve to communicate between the central chamber 38 and the interior of the sleeve. For convenience of manufacture, the sleeve may be formed in two pieces secured together at a parting line 41 through the slot, which then comprises two angularly aligned V-shaped notches.

The spool 31 has three axially spaced heads or lands 42, 43 and 44 which define two flow grooves 45 around the spool inside the liner sleeve, the central land 43 being disposed between the outlet ports 29 and 30 to isolate these ports from each other, and the lands 42 and 44 being disposed closely adjacent the ends of the sleeve 34 when the spool is in the central, neutral position shown in FIG. 1. The return slot 40 is beneath the central land in this position of the spool, and thus is blocked.

Beyond the ends of the sleeve 34 are two chambers 46 and 47 which are filled with fluid under pressure from the supply line 24. While the supply line may have a branch leading to each of these chambers, herein the pressure port 25 opens into the right chamber, and the spool has radial ports and a longitudinal bore 48 connecting the two chambers through the spool and thus supplying fluid from the pressure port 25 to the left chamber 47 as well as the right chamber.

The extreme end portions of the spool 31, beyond the ends of the liner sleeve 34, comprise two heads 49 which are slidably fitted in two rings 50 fast in the bore 35 of the housing and, in effect, constituting separated extensions of the liner sleeve 34. Threaded into each of these heads is a cup-like plug 51 having a hollow coaxial stem 52 projecting into the central bore of the valve spool, and formed with a stepped passage 53 which opens into the spool bore. A tubular screen 54, substantially smaller in diameter than the spool bore, extends through the spool and is fitted over the two stems, with O-ring seals preventing leakage of fluid around the stems.

Thus, fluid under pressure in the spool bore 48 can pass through the screen and the passages 53 into two chambers 55 and 57 at the opposite ends of the spool. The passages constitute flow-restricting orifices for admitting the pressure fluid into the end chambers 55 and 57, and are protected by the screen against the entrance of foreign particles which might block the orifices. A light spring 58 in the right end chamber urges the spool to the left and maintains the spool in the neutral position when the control valve is inactive. When the chambers 55 and 57 are pressurized, the effect of this spring is negligible.

With this arrangement, fluid under supply pressure from the pressure port 25 is admitted into the end chambers 55 and 57 through the restricted orifice passages 53, and pressurizes these chambers, in which opposed end surfaces of the spool are exposed. Thus, by controlling the relative pressures in the end chambers, the spool can be moved in either direction from the neutral position in FIG. 1, and held stationary in other selected positions.

If the spool 31 is moved to the right from the neutral position, pressure fluid from the right supply chamber 46 is admitted through one or more V-shaped flow notches 44' in the right land 44 into the right spool groove 45, and through the port 29 to the line 20 leading to the right end 12 of the cylinder. At the same time, the movement of the central land 43 to the right uncovers the left end portion of the diamond-shaped return slot 40 to pass exhaust fluid from the line 21 and the outlet port 30 to the return port 32.

As the spool 31 is moved to the left from the neutral position, fluid from the chamber 47 is supplied through V-shaped flow notches 42' in the left land 42 to the left spool groove 45 and thus through the outlet port 30 and the line 21 to the left end 13 of the cylinder, while exhaust fluid flows through the line 20, the outlet port 29, and the uncovered right portion of the return slot 40 to the return port 32. Thus, the spool constitutes piston means movable back and forth by pressure in the end chambers and operable in response to such movement to accomplish a variable control function.

The V-shaped notches in the heads 42 and 44, and the diamond-shaped return slot 40, provide an accelerating flow rate increase, relative to the motion of the spool, due to a progressive increase in the rate of the uncovering of the area of the notches as the spool moves. Where a constant increase is desired, rectangular openings may be used, as is well known in the art.

To control the movement of the valve spool 31, a pilot valve assembly 59 is included in the control valve assembly 10, herein being mounted on the left side of the housing 28, to vary the pressures in the end chambers 55 and 57, thereby selectively balancing and unbalancing the opposing forces on the spool, as necessary to move the spool back and forth and to hold it in different positions producing different desired flow conditions. For this purpose, a pilot flow passage 60, 61 extends from each of the end chambers 55, 57, respectively, to the pilot valve assembly 59 and opens into a cavity 62 in a block 63 forming part of the housing of this assembly. From the right end chamber 55, the passage 60 extends through an end plate 64 closing the right end of the bore 35, through the housing 28 and the block 63 to a nozzle 65 projecting into the right side of the cavity.

The passage 61 from the left end chamber 57 is entirely within the block 63, which closes and seals the otherwise open left end of the spool bore. This passage opens at one end into the open end of the bore 35, within the ring 50, and opens at the other end into the cavity 62 through a nozzle 67 projecting into the left side of the cavity, in spaced, opposed relation with the nozzle 65. Thus, flows of pressure fluid from the two end chambers 55 and 57 are directed into the cavity as opposed fluid jets. A drain passage 68 from the cavity returns fluid to a connecting passage 69 in the housing 28 and thus to the return port 32.

Figure 4:
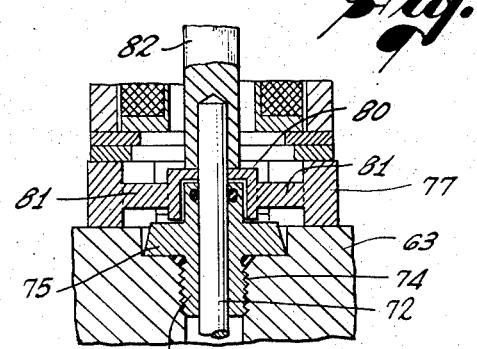
FIG. 4 is an enlarged fragmentary cross-section taken along line 4—4 of FIG. 1.

Disposed between the two nozzles 65 and 67 is a so-called flapper 70 which has oppositely facing flat sides 71 (see FIG. 4) adjacent, but spaced from, both nozzles when the flapper is centered as shown in FIGS. 1 and 4. The flapper is movably mounted for swinging of each flat side toward the adjacent nozzle, thereby progressively increasing the restriction of the flow through that nozzle while simultaneously reducing the restriction of the flow through the other. As a result, the back pressure in the end chamber 55, 57 connected to the restricted nozzle is increased, while the pressure in the other end chamber is reduced, thereby unbalancing the forces on the valve spool 31 to cause it to move away from the increased-pressure chamber and toward the reduced-pressure chamber.

Figure 3:
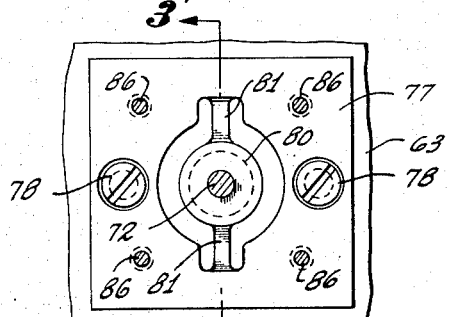
FIG. 3 is a fragmentary cross-section taken along line 3—3 of FIG. 2.

As shown in FIGS. 1 and 3, the flapper 70 is the flattened lower end portion of an elongated rod 72 of circular cross-section which extends upwardly with a clearance fit through a fitting 73 threaded at 74 into the upper end of the cavity 62, and has a peripheral flange 75 clamped in a recess in the upper side of the block 63. The periphery of the flange is beveled, and is engaged by a positioning plate 77 which is held in place by bolts 78 threaded into the top of the block 63. A seal ring 79 restricts leakage of fluid from the cavity 62 around the rod.

Figure 2:
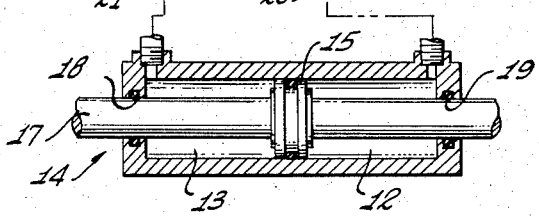
FIG. 2 is an enlarged fragmentary cross-section taken substantially along line 2—2 of FIG. 1.

Immediately above the fitting 73, the rod 72 extends through and is secured to the top wall of an inverted cup 80 (see FIG. 3), and this cup is tiltably supported on two laterally projecting torsion bars 81 (FIGS. 2 and 3) which connect the cup to the positioning plate 77. Preferably, the cup and the torsion bars are formed integrally with the plate, of a suitable torsionally flexible metal.

Thus, the depending flapper 70 is rockable about a pivotal axis defined by the torsion bars 81. Although the clearance in the fitting 73 is small, the amount of swinging required for control purposes is within the range permitted by this clearance.

To produce the desired swinging, an upper extension 82 of the flapper rod 72 projects upwardly into a torque motor 83 and forms the armature of the motor, so as to be selectively attractable, with varying forces, toward one or the other of two opposite poles 84 and 85 of the torque motor. When the upper end of the extension 82, which is square in cross-section, is urged to the right (FIG. 1) toward the pole 85, the flapper 70 swings clockwise about its pivotal axis and toward the nozzle 67 on the left. Conversely, when the upper end is urged counterclockwise, to the left, the lower end swings to the right and toward the nozzle 65 on the right. Screws 86, shown only in FIG. 2, secure the torque motor to the plate 77.

The torque motor 83 may take various forms, being shown herein as having a hollow case 87 mounted on top of the block 63, and a pair of pole pieces 88 and 89 with inturned edge portions spaced apart and terminating in the opposed poles 84 and 85, on opposite sides of the upper end of the armature 82. These pole pieces are magnetized by permanent magnets (not shown), and project upwardly along opposite sides of the armature from a gap piece 90 of non-magnetic material such as aluminum, below which there is a base plate 91 of ferromagnetic material, both of these parts 90 and 91 having central openings through which the armature extends into the motor.

Encircling the armature 82 inside the pole pieces 88 and 89 is a coil 92 for carrying a variable and reversible electric current, and thus creating electromagnetic flux which cooperates with the pole pieces in urging the armature in a selected direction with selected force levels. Thus, the torque motor produces the desired pressure changes in the end chambers 55 and 57 of the spool valve assembly. With this arrangement, it will be seen that precise control of the pressures in the chambers, and of the differentials acting on the valve spool, may be achieved.

In addition to this electrical control, which may be originated at a remote location with a simple controller connected to the pilot valve assembly 59 through suitable electrical wiring, a manual control is provided through a slide 93 having a lost-motion connection with the upper end of the armature 82. The opposite ends 94 and 95 of the slide project out of opposite sides of the case 87 and form push-button operators, and the lost-motion connection comprises a sleeve 97 fastened to the central position of the slide, within the case, with an annular flange 98 which interfits loosely with two spaced tabs 99 projecting upwardly from the upper end of the armature.

Two coiled springs 100 on opposite sides of the flange 98 hold the slide 93 yieldably in a centered position, and the tabs 99 are far enough apart to remain spaced from the flange throughout the full range of motion of the armature. When it is desired to control the motor directly, the slide is pushed in one direction or the other from the centered position so that the flange 98 picks up one of the tabs and shifts the armature in the desired direction. When the slide is released, the springs 100 return it to the centered inactive position.

An important feature of the present invention is the manner in which the movement of the spool 31, in response to an unbalanced force condition, is fed back to the flapper 70 to produce a new balanced condition with the spool in a new selected position. This is accomplished with a relatively simple feedback arrangement which greatly facilitates the servicing of the assembly in the field.

For these purposes, a feedback pin 101 is slidably mounted between the flapper rod 72 and the adjacent end of the valve spool 31, to slide back and forth parallel to the direction of reciprocation of the spool, and abuts at one end against the spool to move therewith, the spool being urged toward the pin by the light spring 58 in the right end chamber. A spring 102 is compressed between this pin and the flapper, to respond to movement of the pin with the spool, and a similar spring 103 acts against the the opposite side of the flapper to counterbalance the force of the first spring when the spool is in the neutral position, thereby holding the flapper centered between the nozzles 65 and 67 when the spool is in this position.

Accordingly, when the flapper 70 is moved to the right by the torque motor 83, increasing the pressure in the right end chamber 55 to shift the spool 31 to the left to initiate a flow of fluid to the right end 12 of the cylinder 14, the movement of the spool shifts the pin 101 to the left to increase the compression of the spring 102 and thus increase the force tending to move the flapper away from the nozzle 65 and back to the centered position. When this increase in force counterbalances the actuating force exerted on the flapper by the torque motor, the flapper again is virtually centered to balance the pressures in the end chambers with the spool in the new position, determined by the input signal to the torque motor. The new spool position, of course, produces a selected flow rate to the right end of the cylinder 14.

Similarly, if the torque motor 83 is actuated to rock the flapper 70 toward the left nozzle 67 with a selected force, the increased pressure in the left end chamber 57 shifts the spool 31 the right, admitting fluid into the left end 13 of the cylinder 14 and, at the same time, releasing the feedback pin 101 to flow the spool to the right under the spring force thereon. As this occurs, the force exerted on the flapper by the right spring 102 is reduced, and the left spring 103 is able to urge the flapper to the right until a new force balance on the flapper is achieved. It therefore will be seen that this relatively simple feedback arrangement effectively controls the flapper, directly in response to movement of the valve spool 31, to control the rate of motion and the positioning thereof.

More specifically, and as shown in FIG. 1, the two springs 102 and 103 are disposed in an intersecting bore 104 in the block 63, perpendicular to the cavity 62 and above the level of the nozzles 65 and 67. A retainer 105 is mounted on the flapper and formed with oppositely opening cups for receiving the ends of the two springs, and a plug 107 is threaded into the open left end of the intersecting bore to abut against the left end of the left spring 103. This plug adjustably positions a stop 108 abutting against the spring and forms a null-adjust device for selectively varying the compression of the spring 103 and thereby balancing its force with that of the spring 102 when the spool 31 is in the neutral position.

The right spring 102 is confined between the retainer 105 on the flapper rod 72 and a head 109 fitted over the adjacent end of the feedback pin 101. Preferably, the pin simply projects with a very close sliding fit through a drilled hole extending through the block and opening toward the open end of spool 35, within the ring 50, so that the projecting right end portion of the pin extends into the bore and abuts against the head 49 on the left end of the spool.

It will be seen in FIG. 1 that the pilot valve assembly 59 is separable as a unit from the spool valve assembly, preferably being secured thereto by bolts (not shown) that are threaded into the left end of the housing 28. The torque motor case 87 similarly is detachably mounted on the block 63 to permit easy access to the parts of the torque motor.

Significantly, when the pilot valve assembly 59 is removed (for example, to permit changing of the valve spool 31), the springs 102 and 103 simply shift the feedback pin 101 to the right until the head 109 abuts against the right end of the intersecting bore 104. Thus, the feedback parts remain in place and ready for simple reassembly as an incident to the bolting of the pilot valve assembly back into place. At most, a minor adjustment of the compression of the spring 103, through the null-adjust plug 107 and stop 108, may be needed to prepare the valve assembly for further operation.

Thus, the control valve assembly 10 can be quickly and easily disassembled, serviced, reassembled and adjusted in a simple operation that may be performed in the field without need for sophisticated tools or a high level of technical skill.

It will be apparent to those skilled in the art that, although a particular form of the invention has been illustrated and described, various modifications can be made without departing from the spirit and scope of the invention.

I claim:

1. A control valve assembly for selectively controlling a flow of actuating fluid to a controlled device, said assembly having, in combination:

a spool valve assembly having a first housing formed with a bore opening through one side of said housing, a spool slidable in said bore, means on said spool and in said bore for controlling the flow of actuating fluid in accordance with the position of the spool along the bore, a pair of fluid chambers in said housing at the opposite ends of said spool, means for supplying fluid under pressure to said chambers to urge the spool in opposite directions along the bore and to hold the spool stationary in a selected neutral position when the opposed forces are balanced, and a flow passage leading from each of said chambers;

a pilot valve assembly having a second housing removably mounted on said one side of said first housing and overlying the open end of said bore, a cavity in said second housing, opposed nozzles opening into said cavity and communicating with said flow passages to receive pressure fluid therefrom and direct the fluid into the cavity as opposed jets, a flapper disposed between said nozzles in spaced relation therewith and movable back and forth between them to variably restrict said nozzles and thereby vary the pressures in said chambers, and actuating means for urging the flapper toward either nozzle with a selected, variable force, said flapper moving toward and away from said open bore end in moving between said nozzles;

and feedback means including an elongated pin slidably supported on said second housing and projecting into said bore through said open end and abutting at one end against said spool, a head on the other end of said pin, a first spring disposed between said head and one side of said flapper and holding said pin against said spool, and a second spring acting against the other side of said flapper and opposing said first spring to urge the flapper to a centered position between said nozzles when the spool is in said selected position.

2. A control valve assembly as defined in claim 1 in which said springs are coiled compression springs, and said second spring is compressed between said flapper and a device for selectively adjusting the spring force.

3. A control valve assembly as defined in claim 1 in which said means for supplying fluid to said chambers include a through bore in said spool supplied with fluid under pressure, and a plug in each end of the spool formed with a restricted orifice communicating between said through bore and the adjacent chamber.

4. A control valve assembly as defined in claim 3 further including a tubular screen extending through said through bore and supported at its ends by said plugs, said orifices opening into the interior of said screen.

5. A control valve assembly as defined in claim 1 in which said flapper is supported in said cavity by at least one torsion bar defining a pivotal axis for the flapper, said actuating means being mounted in said second housing outside said cavity at an end of said flapper outside said cavity.

6. A control valve assembly as defined in claim 5 in which said actuating means is a torque motor having an armature constituting an extension of said flapper.

7. A control valve assembly for selectively controlling a flow of actuating fluid to a controlled device, said assembly having, in combination:

a spool valve assembly having a first housing formed with a bore having one end adjacent one side of the housing, a spool slidable in said bore, means for controlling the flow of actuating fluid in accordance with the position of the spool along the bore, and means for applying fluid pressure to opposed surfaces of said spool to urge the latter in opposite directions along said bore and to hold the spool stationary in a selected position when the opposed forces on the spool are balanced, said pressure-applying means including first and second pressure chambers in which said opposed surfaces are exposed;

a pilot valve assembly having a second housing mounted on said one side of said first housing, a cavity in said second housing, first and second opposed nozzles opening into said cavity, first and second connecting passages communicating between said chambers and said nozzles, a flapper movably supported between said nozzles to variably restrict fluid flows through the nozzles and thereby vary the pressures in said chambers, and actuating means for urging said flapper toward a selected nozzle with a selected force;

and feedback means including an elongated pin slidably supported adjacent said one end of said bore and projecting into the latter into abutting engagement with said spool, a first spring in said second housing compressed between one side of said flapper and said pin and holding the pin in engagement with the spool, and a second spring compressed against the opposite side of said flapper to oppose the force of said first spring on the flapper, whereby the flapper is held in a selected position between said nozzles when said spool is in its selected position, and movement of said flapper out of its selected position by said actuating means changes the position of said spool, and, through said feedback pin, adjusts the force of said first spring.

8. A valve assembly for selectively controlling a flow of actuating fluid to a controlled device, said assembly having, in combination;

a control valve having a housing and a valve spool slidable back and forth in a bore in said housing and displaceable in said bore varying distances from a selected position, said valve being operable as an incident to such displacement to vary said flow in accordance with the amount of displacement;

said housing having a pressure chamber at each end of said spool, and means for delivering pressure fluid to said chambers to exert opposing forces on the spool holding the spool stationary when opposing forces on the spool are balanced, and moving the spool in a selected direction and at controlled rates when the forces are unbalanced;

a pilot valve assembly supported adjacent one end of said bore and having a housing defining a chamber, a pair of spaced, opposed nozzles opening into said pilot valve chamber, a flapper centered between said nozzles in closely spaced relation therewith and supported for back and forth movement to progressively increase the resistance to flow through either one of the nozzles into said pilot valve chamber while progressively reducing the resistance to flow through the other of said nozzles, and actuating means for urging said flapper toward either nozzle with selectively variable forces;

means connecting each of said nozzles to one of said control valve chambers to carry fluid therefrom to the associated nozzle, whereby said flapper variably restricts the flow of fluid under pressure through each control valve chamber to vary the pressure level therein;

and a feed-back mechanism acting between said flapper and said spool and tending to return said flapper to a centered position between said nozzles in response to displacement of said spool, said feedback mechanism comprising a connecting member extending between said pilot valve assembly and said control valve and supported for back and forth movement parallel to the movement of said spool, said connecting member abutting at one end against said spool for movement therewith, a first compression spring acting between said connecting member and the adjacent side of said flapper and urging the latter in one direction toward one of said nozzles, and a second compression spring acting against the opposite side of said flapper in opposition to said first spring and counterbalancing the latter when said spool is in said selected position and said flapper is in said centered position, thereby holding the flapper yieldably in the centered position subject to movement in either direction therefrom by said actuating means and return toward the centered position by movement of said connecting member with said spool.

9. A control valve assembly for selectively controlling a flow of actuating fluid to a controlled device, said assembly having in combination:

a valve assembly having a valve member reciprocable along a predetermined path, means for varying the flow of actuating fluid in accordance with the position of the valve member along said path, and means for applying fluid pressure to opposed surfaces of said valve member to urge it in opposite directions along said path and to hold it stationary when the opposed forces on the valve member are balanced, said pressure-applying means including two pressure chambers in which said opposed surfaces are exposed;

a pilot valve assembly having a pair of orifices each connected to one of said chambers to receive pressure fluid therefrom, flapper means for variably restricting the flows of pressure fluid through said orifices from said chambers and thereby controlling the pressures in said chambers, and actuating means for selectively urging said flapper means toward a selected orifice to increase the pressure in the associated chamber in accordance with the force with which the flapper means is urged toward the orifice;

and a feedback mechanism including a pin slidably supported for reciprocation parallel to said path and movable back and forth by the valve member, and spring means yieldably urging said flapper means to a selected position relative to said orifices, said pin being connected to said spring means to vary the force of the spring means in accordance with changes in the position of the valve member.

10. A control valve assembly as defined in claim 9 in which said spring means comprise coiled compression springs acting on opposite sides of said flapper, one of said springs being compressed between said pin and said flapper to increase its force in one direction of movement of the pin and decrease its force in the other direction.

11. A control valve assembly as defined in claim 9 in which said pin is supported and movably retained on said pilot valve assembly and projects into said valve assembly into abutting engagement with said valve member.

12. A control valve assembly as defined in claim 11 in which said valve assembly has a bore with an open end on one side, and said pilot valve assembly is removably mounted on said one side with said pin projecting into said bore into engagement with the adjacent end of said valve member.

13. A controller assembly having, in combination:

a piston assembly having piston means therein mounted for back and forth reciprocation, and means for applying fluid pressure to opposed surfaces of said piston means to urge the latter in opposite directions and to hold the piston means stationary when the opposed forces thereon are balanced, said pressure-applying means including two pressure chambers in which said opposed surfaces are exposed;

a pilot valve assembly having a pair of orifices each connected to one of said chambers to receive pressure fluid therefrom, flapper means for variably restricting the flows of pressure fluid through said orifices from said chambers and thereby controlling the pressures in said chambers, and actuating means for selectively urging said flapper means toward a selected orifice to increase the pressure in the associated chamber in accordance with the force with which the flapper means is urged toward the orifice;

feedback mechanism including a pin slidably mounted for back and forth reciprocation by said piston means, longitudinally thereof, and spring means yieldably urging said flapper means toward a selected position relative to said orifices, said pin being connected between said spring means and said piston means to vary the force of the spring means in accordance with the position of said piston means;

and means responsive to changes in the position of said piston means for accomplishing a variable control function.

14. A controller assembly as defined in claim 13 in which said spring means are first and second opposed springs disposed on opposite sides of said flapper means to urge the latter toward said selected position, and said pin acts between said piston means and one of said springs to vary the force thereof in accordance with the position of said piston means.

15. A controller assembly as defined in claim 14 in which said spring means also include a device for selectively adjusting the force of the other of said springs.

16. A controller assembly as defined in claim 13 in which said pilot valve assembly is mounted on one end of said piston assembly with said pin extending between said assemblies and engageable with an end of said piston means for longitudinal movement by said piston means, said flapper means extending transversely of said pin, and said spring means comprising a first compression spring disposed between said pin and one side of said flapper means, and a second compression spring on the other side of said flapper means opposing said first spring.

17. A controller assembly as defined in claim 16 in which said pilot valve assembly is detachable mounted on said pilot valve assembly, and said pin is slidably mounted in said pilot valve assembly to project from one side thereof toward the piston assembly, said pin having means thereon for retaining it on the pilot valve assembly when the latter is detached.

* * * * *